Oct. 28, 1947.   F. N. HAYS   2,429,880
METHOD FOR OPERATING SECTIONABLE HEAT EXCHANGERS
Filed Jan. 5, 1945   3 Sheets-Sheet 1

INVENTOR
Fred N. Hays
BY John E. Jackson
ATTORNEY

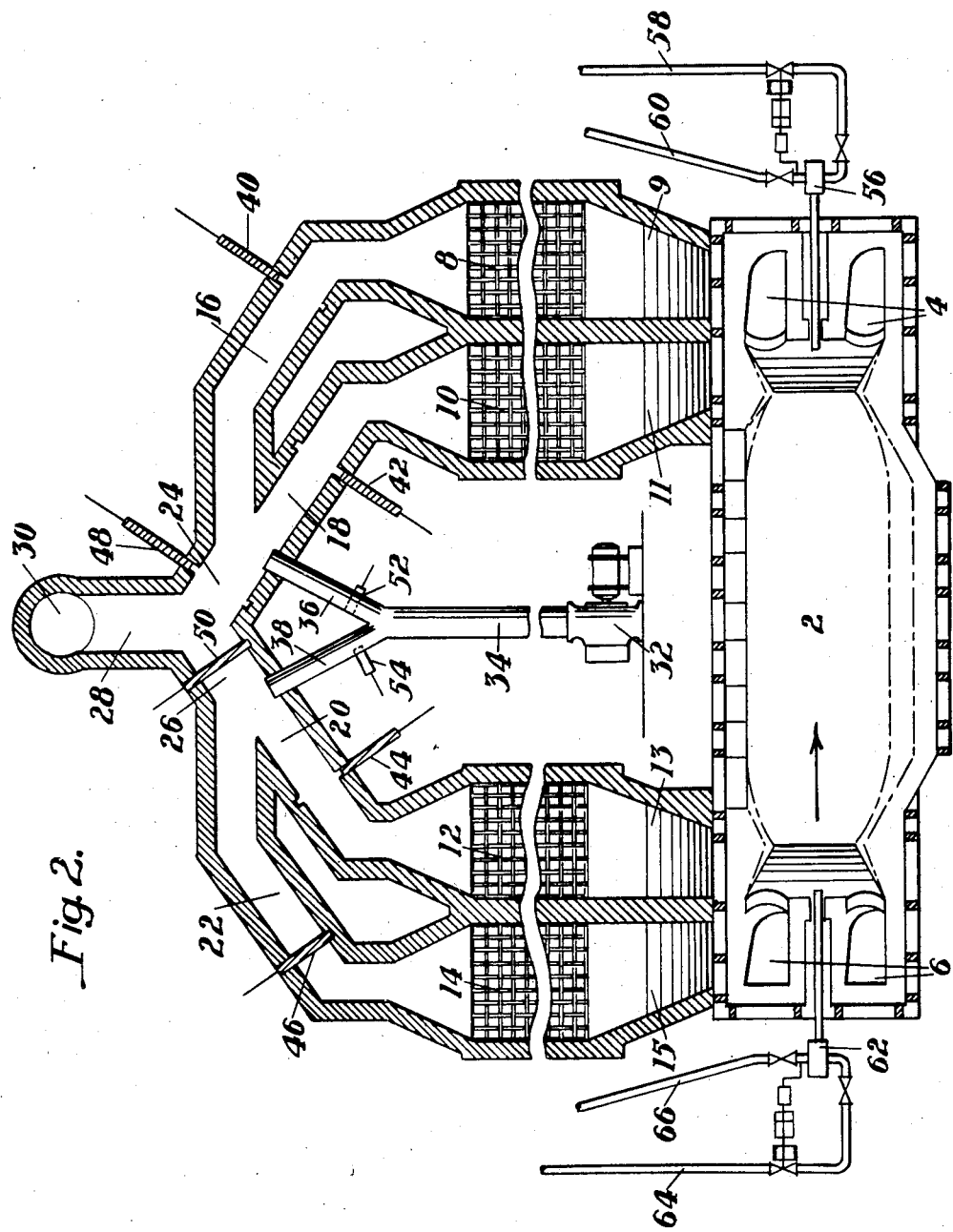

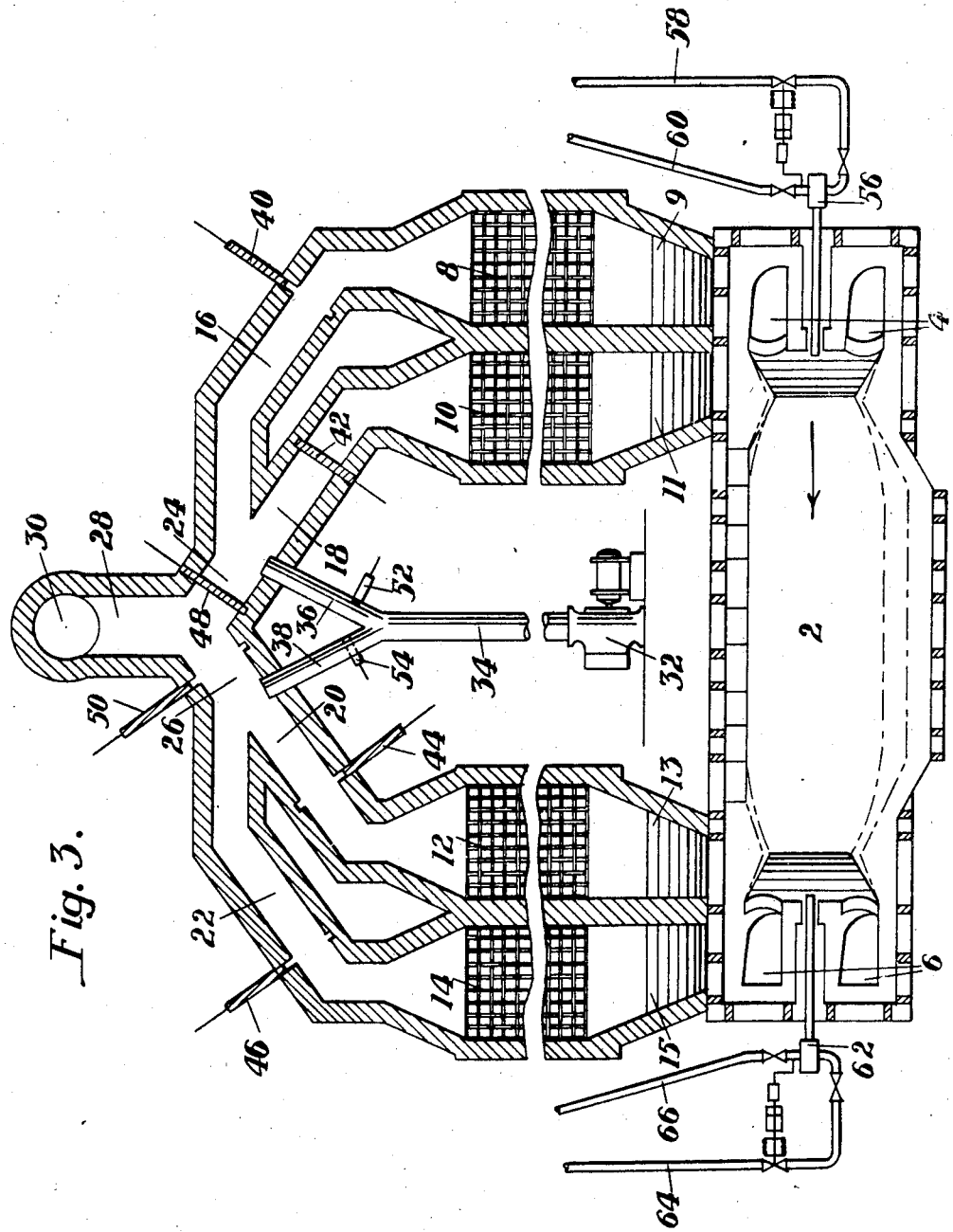

Patented Oct. 28, 1947

2,429,880

UNITED STATES PATENT OFFICE 2,429,880

METHOD FOR OPERATING SECTIONABLE HEAT EXCHANGERS

Fred N. Hays, Edgewood, Pa., assignor to Carnegie-Illinois Steel Corporation, a corporation of New Jersey Application January 5, 1945, Serial No. 571,382

7 Claims. (Cl. 263—15)

The invention relates to an improvement in the method of operation of regenerative heating devices. More particularly the invention relates to a method of operating such devices in which the reversals of direction of travel of streams of hot gases and streams of gases being heated follow each other in a predetermined sequence.

One object of the present invention is the provision of a method of operating regenerative heating devices whereby the heat recovery is improved.

A further object of the invention is the provision of such method of operation of regenerative heating devices that the overall heating efficiency of the devices is raised.

These and further objects of the invention will appear in the following description.

The invention will be described and illustrated in connection with the operation of an open hearth furnace for the production of steel. It is to be understood, however, that it has application to various other types of heating devices employing the regenerative principle, such as regenerative soaking pits, and regenerative furnaces in general.

In the open hearth furnace, checkers are employed for raising the temperature of the incoming air to the point at which the use thereof for combustion of selected fuel results in a predetermined minimum flame temperature. The checkers usually comprise a gas tight jacket filled with refractory brickwork placed in a manner resulting in the exposure of a maximum brick surface while at the same time leaving adequate spaces in the brickwork for the easy passage of large volumes of gases. It is conventional to provide two pairs of regenerative checker chambers for each open hearth furnace, each pair being placed at the opposite end of the furnace. For furnaces using a low heat content fuel, such as producer gas, fuel preheating is necessary, and in such furnaces one of the checker chambers of each pair is designed for heating such gaseous fuel. Furnaces using high heat content fuel, such as oil, tar, natural gas, and coke oven gas, to which the present invention particularly relates, also have two pairs of checkers, but both are employed for heating air alone. The practice of using smaller checker chambers in pairs rather than larger single chambered checkers even though only air is heated in both chambers of the pair arises from the discovery that any gas such as air tends to take a direct path from the inlet to the outlet in a larger chamber, avoiding the longer paths through the chamber and thus leading to low efficiency thereof. Smaller checker chambers, having a more uniform flow of gas therethrough, are thus more efficient.

In the conventional operation of such open hearth furnace equipped with two pairs of checker chambers and employing a fuel having a high heat content so that only the air is preheated by passing through the checker chambers, the incoming air passes through both chambers and into ports at one end of the furnace, where it mixes with the fuel forming a flame extending over the top of the bath of metal. The exhaust gases are led out the other end of the furnace chamber, whence they pass through both checker chambers of the opposite pair, to the exhaust flue, and thence into the stack. Such operation, therefore, involves the heating up of the incoming air by the previously heated checkers on one end of the furnace and the heating, by the exhaust gases, of the checkerwork of the checker chambers at the other end of the furnace.

After a certain interval of time the checkerwork through which the incoming air has been passing will have reached a certain minimum temperature, and will require to be heated again in order to permit efficient operation of the furnace, and the checker chambers through which the exhaust gases have been traveling will have been heated to a predetermined elevated temperature. At this time the flame traveling through the furnace is reversed, the checker chambers formerly giving up their heat to the incoming air now being heated by the passage of exhaust gases therethrough, and the checker chambers formerly being heated now being utilized to heat the incoming air. In such conventional method of operation the two checker chambers of each pair were always operated in parallel; that is, they were both either heating the incoming air or being heated by exhaust gases at the same time.

I have found that greatly improved efficiency of operation results in the operation of such regenerative heating devices if the incoming cold air passes through the heated checkers at a speed much above that formerly used while maintaining essentially the same speed of flow of the exhaust gases through the checkers being heated that is conventionally used. The greater velocity of the incoming air through the checker chamber required by the teachings of the present invention may be provided, in accordance with a preferred method, by allowing a constant volume of air specified by furnace requirements, to pass through a smaller cross-section of checkers than was formerly employed. One manner in which this can be accomplished is illustrated in the accompanying drawings, in which:

Figure 2 is a similar schematic view with the incoming air valves only shown in different positions from those in Figure 1; and Figure 3 is a similar schematic view showing one position of the air valves when flow of gases through the furnace is reversed.

Figure 1:
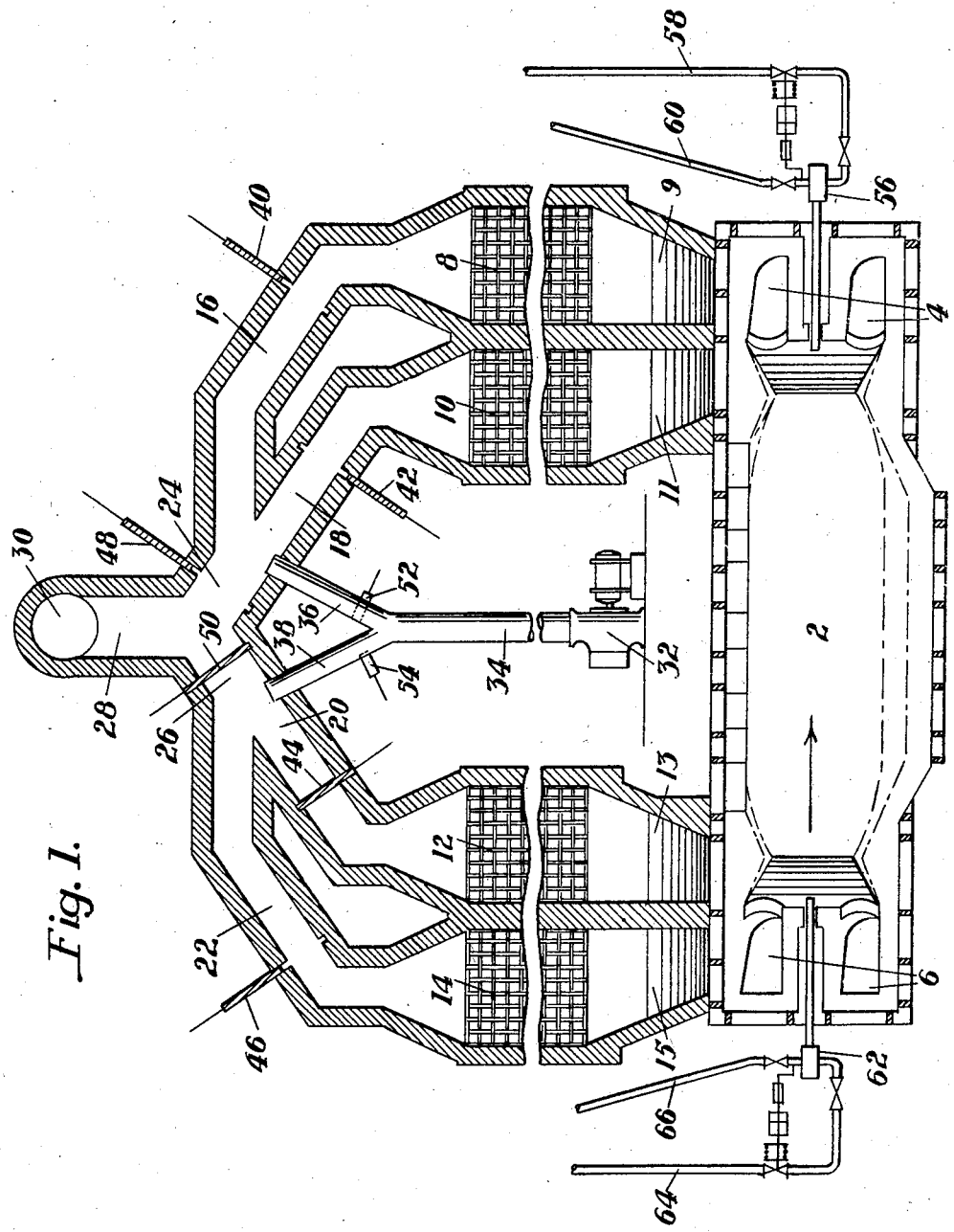
Figure 1 is a schematic view in horizontal cross-section of an open hearth furnace with the air valves shown in one position during practice of the method.

In all three figures of the drawings, the apparatus is identical and the various parts are designated by the same reference numerals. Such three figures, which represent the apparatus in three different portions of the heating cycle, each show the air valves in positions appropriate to that portion of the cycle which it illustrates.

In the drawings, an open hearth furnace designated generally by the reference character 2, which is provided at opposite ends thereof with ports 4 and 6, is equipped with two chambered, or bicameral, checker chambers at each of the opposite ends thereof communicating with the ports as shown. At the right hand end of the furnace, checker chambers 8 and 10 are connected to ports 4 through passages 9 and 11, respectively, and at the left hand end of the furnace checker chambers 12 and 14 are connected to ports 6 through passages 13 and 15, respectively.

The ends of the checker chambers 8 and 10 remote from the furnace are provided with passageways 16 and 18, respectively, which merge into a common passage 24. At the ends of checker chambers 12 and 14 remote from the furnace there are provided passageways 20 and 22, respectively, which merge into a common passageway 26. Passageways 24 and 26 in turn are connected to a common flue 28 which leads to an exhaust stack 30. Cold incoming air is supplied to the system by means of a force fan 32 delivering air through pipe 34, which branches, as shown, into pipes 36 and 38, pipe 36 being connected to passage 24 and pipe 38 being connected to passage 26.

In order to allow reversal of the furnace, as desired, and the operation of the system in the manner of the present invention, valves are provided whereby each of the checker chambers may be cut off from connection with the flue and whereby the cold incoming air may be directed into the desired pair of checker chambers but may be cut off from communication with the flue. Such objects may be accomplished by the valves schematically shown in the drawings, there being a slide valve 40 in passage 16, a similar valve 42 in passage 18, a slide valve 44 in passage 20, and a slide valve 46 in passage 22. There are also provided slide valves 48 and 50 in passages 24 and 26, respectively. In order to direct the incoming cold air into the desired pair of checker chambers, slide valves 52 and 54 are also provided in the branch pipes 36 and 38, respectively, of the cold air delivery system. It is to be understood that the valves shown are by way of illustration only, and that other valves accomplishing the same purpose as, for instance, double acting valves which both close the end of the checker chamber remote from the furnace from communication with the flue and permit the entry of cold air, thereinto, may be employed. The right hand end of the furnace is provided with a burner 56, which is supplied with liquid fuel through pipe 58 and the steam for atomizing such fuel through pipe 60. The left hand end of the furnace is provided with a similar burner 62, which is supplied with liquid fuel through pipe 64 and with steam to atomize such fuel through pipe 66. Each burner is provided with suitable shut-offs, schematically indicated in the drawings, whereby the burner at the end of the furnace temporarily being used as the exhaust end may be shut off.

The manner of operation, in accordance with my invention, of the open hearth furnace shown in the drawings will be readily understood by a comparison of Figures 1, 2, and 3, which show the positions of the air valves in successive stages of the operating cycle. In Figure 1, flame travel through furnace 2 is in the direction of the arrow. The preheated air entering the furnace in this portion of the cycle is supplied solely through previously heated checker chamber 14, which receives cold incoming air from air delivery pipes 34 and 38. Valve 52 is advanced to a closed position to prevent the escape of the cold air into the stack, whereas valve 54 is opened to allow delivery of cold air into the passage 22. Valve 50 is likewise closed, as is valve 44, whereas valve 46 is open. Thus, of the two previously heated checker chambers 12 and 14, chamber 12 is isolated and remains in its previously heated condition, and chamber 14 alone is used when the valves are positioned in the manner shown in Figure 1. The exhaust gases travel through ports 4, passages 9 and 11, and through both checker chambers 8 and 10, giving up their heat thereto, after which they escape to the flue 28 and stack 30 by way of passageways 16, 18, and 24. As shown valves 40, 42, and 48 are held in the open position to allow such travel of the exhaust gases.

After the brickwork in checker chamber 14 has been cooled to a certain point, which may be such that the checkerwork will no longer heat the incoming gas to an adequately high temperature, the positions of valves 44 and 46 are reversed to bring them to the position shown in Figure 2. As shown in Figure 2, chamber 14 is then cut off from passage 22 by valve 46, and chamber 12, which has remained in substantially its original heated condition, is then connected to the source of cold incoming air, and the preheated air entering the furnace is then supplied by checker chamber 12. After the brickwork in chamber 12 has likewise cooled to a certain point, which may be such that the checkerwork will no longer heat the incoming air to an adequately high temperature, the furnace is reversed to cause the flame to travel therethrough in the opposite direction and to cause the incoming air to be heated in the checker chambers 8 and 10 at the other end of the furnace. It is to be understood, however, that the heat in chambers 12 and 14 need not be totally exhausted before a change is made from one to the other of the pairs of chambers. It may be preferred to extract only a portion of the heat from one checker chamber, to shut it off temporarily while using the other of the pair as a means for heating the air, and then again to resume the use of the first chamber. In such manner, the heat at the surface of the checkerwork may be constantly renewed by flow from the interior of the bricks of the checkerwork to the surfaces thereof, and the extent of the fluctuations in temperature to which the incoming air is heated may be minimized.

After the direction of flame travel through the furnace has been reversed, the positions of the various valves will be those shown in Figure 3 of the drawings. As there shown, the direction of flame travel through the furnace, shown by the arrow, is opposite that in the portion of the cycle shown in Figure 1. As shown in Figure 3, checker chamber 10 is isolated in its original heated condition by the closing of valve 42, and the preheated incoming air is supplied by checker chamber 8, which is placed in communication with air delivery duct 34, through passages 24 and 16, by the opening of valve 40. Valve 48 is closed to cut off the cold air supply from the stack, whereas valves 44, 46, and 50 are opened to allow the passage of the exhaust gases through checker chambers 12 and 14, which are now being heated thereby, and thence to the stack. After the heat in checker chamber 8 has been partially or totally absorbed by the incoming gases, chamber 10 is then utilized by closing valve 40, thereby shutting off chamber 8, and opening valve 42, so that the incoming cold air supply is diverted through chamber 10, where it is heated to the requisite temperature before entering the furnace.

The advantages of the method of the present invention will be more readily appreciated by consideration of a portion of the cycle of operations in a typical open hearth furnace. In such furnace, which is of 100–200 ton capacity, the time required to heat the checkerwork by exhaust gases to the desired temperature is 15 minutes, after which a reversal of the cycle is required. Cold air, supplied by a fan, such as fan 32, is let into one heated checker chamber, such as chamber 8, through valves, such as valves 52 and 40, at a rate required by furnace operation. Operating on coke-oven tar fuel, the furnace requires an average of 10,000 cubic feet per minute of unheated air. At the moment of reversal, the average temperature of the heated brickwork of the checker chamber being employed to heat the air may be considered as 2000° F. Air entering said chamber counter at a temperature of about 80° F. is heated therein to from 1900° to 2150° F. before passing into the furnace. Heat absorption from the checkerwork gradually lowers the temperature or air leaving the checkers. At the end of substantially 7½ minutes, the temperature of the heated air reaches the permissible minimum of 1900° F. Valve 40 is then closed and valve 42 supplying checker chamber 10 is opened. Since the brickwork of checkers 10 is substantially at the temperature initially prevailing in chambers 8 and 10 before the reversal of the furnace 2, the air heating cycle taking place in chamber 10 does not appreciably differ from that occurring in chamber 8 as described hereinbefore. Thus, after 7½ minutes of operation using chamber 10 as a heating chamber, the furnace must be reversed to again heat chambers 8 and 10. By the use of bicameral checkers heated together but cooled successively by the air passage, substantially as described, heat recovery in an open hearth furnace is increased by about 15%. Thus it can be seen that not only is the extent of undesirable temperature fluctuations in the furnace cut substantially in half, but that the general performance of the furnace is materially improved.

The significant improvement in efficiency of operation of an open hearth furnace such as that above, which is merely typical of regenerative heating devices to which the present invention may be applied, may be explained at least in part by a consideration of the manner in which heat transfer takes place in the various parts of the cycle. In gas checkers, using this term to designate checkers being heated, heat is brought in by gases and absorbed by solids. Heat absorption by the checker surfaces from the exhaust gases depends therefore, almost exclusively on radiation and follows the Stefan-Boltzman law, namely, $E = K(T^4 - T_0^4)$ where E is energy, K is a constant, and T and $T_0$ are the temperatures of the heat-carrying and heat-absorbing bodies, respectively. Heating of air by hot checker surfaces in air checkers, on the other hand, is controlled largely by convection phenomena, namely, by transfer and diffusion of the heat in a fluid mass by means of the motion of particles thereof, since the conduction of heat through a stagnant mass of fluid is very slow in liquids, and almost, if not wholly, inappreciable in gases. Thus it can be seen that the method of the present invention makes it possible to approach optimum conditions for heat transfer, both in the heated checkers which heat the incoming cold air on the side of the furnace which at the time has the burner in operation, and in the gas checkers, that is, the checkers at the exhaust end of the furnace being heated by the exhaust gases.

Due to the use of only one of the pair of heated checkers at one time for heating the incoming cold air, such air, which is supplied in the same volume as in the conventional method wherein both heated checkers are used simultaneously, passes through the heated checkers at a speed much higher than formerly. This, of course, follows from the restricted area presented by the single checker chamber. Such condition favors transfer of heat from the checkers to the gas, since the gas moving at high speed continuously scours off the thin film of gas immediately in contact with the checker surfaces, thereby abstracting heat from the checkers at a much faster rate than is possible if such air moved slowly. Furthermore, because of the large volume of incoming air which must crowd through the single checker chamber, the air tends to pass much more uniformly through the checkers over its entire area than it would if smaller volumes of air at lower speeds were passed therethrough.

This improvement in efficiency of heating the incoming air is accomplished without altering the relatively slow travel of the exhaust gases through the checkers being heated. This allows the optimum absorption of heat from the gas by the checkers which, as stated above, depends almost exclusively on radiation of heat from the exhaust gases to the checkers. Such relatively slow travel of the exhaust gases is possible because both chambers of the checkerwork are heated at once and thus each chamber receives but one half the exhaust gases.

The method of the present invention offers, in addition to the advantages already outlined, a convenient means for overcoming the disadvantages associated with an exceptionally low thermal diffusivity of checkerbrick. The rate of heat travel from the inside of a particular type of brick to its surface may be too slow for maintaining a given temperature at the surface when using the rate of air travel specified by furnace requirements. When the heat stored near the surface is consumed, the supply thereof from the inside of the brick frequently is inadequate, long before the total available supply of heat is exhausted, to maintain a proper temperature balance. Since slowing the rate of air supply in order to adjust surface temperature of the checkerbrick to the rate of heat transfer from the inside of the brick is impossible in the light of thermal requirements of the furnace, temporary interruption of the air flow through a portion of the checkerwork in accordance with the present invention may be employed for reaching the desired heat-transfer conditions.

Thus, the present invention makes possible the proper adjustment of heat supply to stream velocity, through the interruption of the air stream through a particular section of checkerwork at frequent intervals. When air circulation is stopped in one chamber and the air is forced to pass through another, the brick temperature of the former chamber has time for equalization. On resumption of the air stream through the first chamber, the bricks thereof are at normal surface temperature rather than having a surface temperature considerably below the limit inherent in conventional operations. By closing the valve of one air heating chamber and opening that of another, the period of rest and of operation can be repeated at will.

Optimum reversal frequency of the type described depends on individual conditions to be met in the operation of any particular furnace. In general, it can be stated that reversals can be instituted at any fraction of air-cycle time. Furthermore, certain advantages are observed when the time of valve reversals is adjusted to allow one valve to be only partially closed while another is being opened, provided that the combined area of valves opening equals at all times the area of a fully open valve.

While, for the purpose of clearness, the description has dealt with regenerators operated in connection with open hearth furnaces, the present invention embraces in its scope other installations in which the heat of the gases is absorbed periodically by properly designed masses of refractory material and then transferred to a gaseous fluid passing over and in contact with said heated mass of refractory material. Regenerative installations suitable for the application of the present invention are exemplified by melting furnaces, soaking pits, and heating furnaces, used in many different applications. It will therefore be understood that the invention is capable of numerous variations readily apparent to those skilled in the art, and that its scope is defined in the appended claims.

I claim:

1. The method of operating regenerative heating apparatus having at least one heat regenerating device operable in separate sections, each section having heat storage means of substantial thickness therein, which comprises simultaneously heating all sections of the device by the passage therethrough of heated fluid, and, after the heat storage means in the sections have reached a predetermined temperature, cooling the sections of the heat regenerating device by directing fluid to be heated solely through a first section of the heat regenerating device, allowing the fluid to be heated to flow through the first section until the heat transferring surfaces of the heat storage means thereof fall below a predetermined temperature, thereupon shutting off the passage of such fluid to be heated through the first section and directing it solely through another section of the heat regenerating device, allowing the said first section of the heat regenerating device to stand without the passage of fluid therethrough to allow substantial heat flow from the interior of the heat storage means thereof to the heat transferring surfaces thereof to raise the temperature of the surfaces to a predetermined value by the heat internally of such heat storage means, and then reestablishing flow of the fluid to be heated solely through said first section of the heat regenerating device.

2. The method of operating a furnace having at least one heat regenerating device operable in substantially identical separate sections, each section having heat storage means of substantial thickness therein which comprises simultaneously heating all sections of the device by the passage therethrough of heated gas from the furnace, and, after the heat storage means in the sections have reached a predetermined temperature, cooling the sections of the heat regenerating device by directing gas to be heated solely through a first section of the heat regenerating device, allowing the gas to be heated to flow through the first section until the heat transferring surfaces of the heat storage means thereof fall below a predetermined temperature, thereupon shutting off the passage of such gas to be heated through the first section and directing it solely through another section of the heat regenerating device, allowing the said first section of the heat regenerating device to stand without the passage of gas therethrough to allow substantial heat flow from the interior of the heat storage means thereof to the heat transferring surfaces thereof to raise the temperature of the surfaces to a predetermined value by the heat internally of such heat storage means, and then reestablishing flow of the gas to be heated solely through said first section of the heat regenerating device, the gas so heated by flow through the sections of the heat regenerating device being introduced into the furnace.

3. The method of operating a regenerative heating furnace having at least one heat regenerating checker operable in separate sections, each section having heat storage means of substantial thickness therein in the form of checker bricks laid with flues therethrough which comprises simultaneously heating all sections of the checker by the passage of heated exhaust gases from the furnace through them with the sections connected in parallel, and, after the checker bricks in the sections have reached a predetermined temperature, cooling the sections of the checker by directing air to be heated solely through a first section of the checker, allowing the air to be heated to flow through the first section until the heat transferring surfaces of the checker bricks thereof fall below a predetermined temperature, thereupon shutting off the passage of such air to be heated through the first section and directing it solely through another section of the checker, allowing the said first section of the checker to stand without the passage of gas therethrough to allow substantial heat flow from the interior of the checker bricks thereof to the heat transferring surfaces thereof to raise the temperature of the surfaces to a predetermined value by the heat internally of such checker bricks, and then reestablishing flow of the air to be heated solely through the said first section of the checker, the air so heated being introduced into the furnace.

4. The method of operating a regenerative furnace having at least one heat regenerating checker operable in two separate sections, the two sections being substantially identical and having heat storage means of substantial thickness therein in the form of checker bricks laid with flues therethrough which comprises simultaneously heating both sections of the checker by the passage of the heated exhaust gases from the furnace through them with the sections connected in parallel, and, after the checker bricks in the sections have reached a predetermined temperature, cooling the sections of the checker by directing air to be heated solely through a first section of the checker, allowing the air to be heated to flow through the first section until the heat transferring surfaces of the checker bricks thereof fall below a predetermined temperature, thereupon shutting off the passage of such air to be heated through the first section and directing it solely through the second section of the checker, allowing the said first section of the checker to stand without the passage of gas therethrough to allow substantial heat flow from the interior of the checker bricks thereof to the heat transferring surfaces thereof to raise the temperature of the surfaces to a predetermined value by the heat internally of such checker bricks, and then reestablishing flow of the air to be heated solely through the said first section of the checker, the air so heated being introduced into the furnace.

5. The method of operating a regenerative heating furnace having at least one heat regenerating checker associated with each of the opposite ends of the furnace, each of said checkers being operable in separate sections, said furnace being operable by the cyclical reversal of the direction of flow of heated gases therein, each section of the checker having heat storage means of substantial thickness therein in the form of checker bricks laid with flues therethrough comprising simultaneously heating all sections of the checker associated with the then exhaust end of the furnace by the passage of exhaust gases from the furnace through them with the sections connecting in parallel, and, after the checker bricks in the sections being so heated reach a predetermined temperature reversing the flow of gases through the furnace so that the air entering the furnace is heated by the previously heated checker bricks, air to be heated being led first solely through a first section of the heated checker, allowing the air to be heated to flow through the first section until the heat transferring surfaces of the checker bricks thereof fall below a predetermined temperature, thereupon shutting off the passage of such air to be heated through the first section and directing it solely through another section of the checker, allowing the said first section of the checker to stand without the passage of gas therethrough to allow substantial heat flow from the interior of the checker bricks thereof to the heat transferring surfaces thereof to raise the temperature of the surfaces to a predetermined value by the heat internally of such checker bricks, and thereupon reestablishing flow of the air to be heated solely through said first section of the checker.

6. The method of operating an open hearth furnace having checkers designated gas checkers at the exhaust end of the furnace and checkers designated air checkers at the end of the furnace at which the burner is operating, both the gas and air checkers being operable in separate substantially identical sections, each section having heat storage means of substantial thickness therein in the form of checker bricks laid with flues therethrough which comprises heating all sections of the gas checkers together by passing the exhaust gases of the furnace through such sections connected in parallel, heating the gas entering the furnace by passing it first solely through a first section of the previously so heated air checkers, the other sections of the air checkers being held without the passage of gas therethrough, allowing the air to be heated to flow through the first section until the heat transferring surfaces of the checker bricks thereof fall below a predetermined temperature, thereupon shutting off the passage of air to be heated through the first section of the air checkers and directing it solely through another section of the air checkers, allowing the said first section of the air checkers to stand without the passage of gas therethrough to allow substantial heat flow from the interior of the checker bricks thereof to the heat transferring surfaces thereof to raise the temperature of the surfaces to a predetermined value by the heat internally of such checker bricks, and thereupon reestablishing flow of the air to be heated solely through said first section of the air checkers.

7. The method of operating a reversible open hearth furnace operating on fuel having a high heat content, said furnace being provided with gas checkers and air checkers each operable in two sections, each section having heat storage means of substantial thickness therein in the form of checker bricks laid with flues therethrough which comprises heating both sections of the gas checkers connected in parallel by exhaust gases from the furnace, reversing the path of the flame through the furnace, heating the sections of the air checkers by passing the exhaust gases therethrough with such sections connected in parallel, closing a first section of the previously heated gas checkers, heating the air entering the furnace by passing it solely through the second section of the gas checkers, allowing the air to be heated to flow through such second section of the gas checkers until the heat transferring surfaces of the checker bricks thereof fall below a predetermined temperture, thereupon shutting off the passage of such air to be heated to such second section and directing it solely through the first section of the gas checkers, allowing the said second section of the gas checkers to stand without the passage of gas therethrough to allow substantial heat flow from the interior of the checker bricks thereof to the heat transferring surfaces thereof to raise the temperature of the surfaces to a predetermined value by the heat internally of such checker bricks, then reestablishing flow of the air to be heated solely through said second section of the gas checkers, repeating such process until the internal temperature of the checker bricks of both the first and second sections of the gas checkers have fallen below a predetermined point, and thereupon reversing the flow of gases through the furnace.

FRED N. HAYS.

REFERENCES CITED

The following references are of record in the file of this patent:

UNITED STATES PATENTS

| Number | Name | Date |
| --- | --- | --- |
| 1,844,867 | Byrnes | Feb. 9, 1932 |
| 1,885,704 | Fiorelli | Nov. 1, 1932 |
| 2,063,401 | Rossman | Dec. 8, 1936 |